United States Patent [19]

Okazawa et al.

[11] Patent Number: 5,751,976
[45] Date of Patent: May 12, 1998

[54] BUS SYSTEM FOR USE WITH INFORMATION PROCESSING APPARATUS

[75] Inventors: Koichi Okazawa, Tokyo; Koichi Kimura; Hitoshi Kawaguchi, both of Yokohama; Ichiharu Aburano, Hitachi; Kazushi Kobayashi, Ebina; Tetsuya Mochida, Yokohama, all of Japan

[73] Assignee: Hitachi, Ltd., Tokyo, Japan

[21] Appl. No.: 601,993

[22] Filed: Feb. 15, 1996

Related U.S. Application Data

[63] Continuation of Ser. No. 449,088, May 24, 1995, Pat. No. 5,668,956, which is a continuation of Ser. No. 311,893, Sep. 26, 1994, Pat. No. 5,483,642, which is a continuation of Ser. No. 705,701, May 23, 1991, abandoned.

[30] Foreign Application Priority Data

| Jun. 4, 1990 | [JP] | Japan | 2-144301 |
| May 10, 1991 | [JP] | Japan | 3-105536 |

[51] Int. Cl.$^6$ ............................. G06F 13/00
[52] U.S. Cl. ............... 395/306; 395/309; 395/840
[58] Field of Search ............. 395/280, 306, 395/308, 309, 856, 858, 287; 370/85.9, 85.13

[56] References Cited

U.S. PATENT DOCUMENTS

| 4,016,546 | 4/1977 | Bennett et al. | 395/308 |
| 4,665,483 | 5/1987 | Ciacci et al. | 395/294 |
| 4,695,944 | 9/1987 | Zandveld et al. | 395/285 |
| 4,700,348 | 10/1987 | Ise et al. | 340/825.01 |
| 4,780,813 | 10/1988 | Gerety et al. | 395/866 |
| 4,851,990 | 7/1989 | Johnson et al. | 395/280 |
| 4,945,267 | 7/1990 | Galbraith | 327/434 |
| 4,945,540 | 7/1990 | Kaneko | 371/57.1 |
| 4,982,321 | 1/1991 | Pantry et al. | 395/287 |
| 5,003,465 | 3/1991 | Chisholm et al. | 395/845 |
| 5,274,795 | 12/1993 | Vachon | 395/500 |
| 5,359,715 | 10/1994 | Heil et al. | 359/308 |
| 5,483,642 | 1/1996 | Okazawa et al. | 395/306 |
| 5,506,973 | 4/1996 | Okazawa et al. | 395/306 |

FOREIGN PATENT DOCUMENTS

| 0141302-A2 | 5/1985 | European Pat. Off. |
| 0191939-A1 | 8/1986 | European Pat. Off. |

OTHER PUBLICATIONS

Glass, "Inside EISA", *BYTE*, V. 14, No. 12, Nov. 1989, pp. 417–425.

Baran, "EISA Arrives", *BYTE*, V. 14, No. 12, Nov. 1989, pp. 93–98.

"The Surging RISC", *Nikkei Electronics*, No. 474, May 29, 1989, pp. 106–119.

*Primary Examiner*—Glenn A. Auve
*Attorney, Agent, or Firm*—Fay Sharpe Beall Fagan Minnich & McKee

[57] ABSTRACT

A processor bus linked with at least a processor, a memory bus linked with a main memory, and a system bus linked with at least an input/output device are connected to a three-way connection control system. The control system includes a bus-memory connection controller connected to address buses and control buses respectively of the processor, memory, and system buses to transfer address and control signals therebetween. The control system further includes a data path switch connected to data buses respectively of the processor, memory, and system buses to transfer data via the data buses therebetween depending on the data path control signal.

6 Claims, 13 Drawing Sheets

FIG. 9

| MASTER | SLAVE | READ/WRITE | DIR_P 511 | DIR_M 512 | DIR_S 513 | SEL_P 514 | SEL_M 515 | SEL_S 516 | DT_CNT 420 |
|---|---|---|---|---|---|---|---|---|---|
| NUMBER IN FIG.5 | | | | | | | | | |
| IDLE | | | 0 | 0 | 0 | 0 | 0 | 0 | 000 |
| PROCESSOR 101 | MAIN MEMORY 104 | R | 1 | 0 | 0 | 0 | 0 | 0 | 001 |
| PROCESSOR 101 | MAIN MEMORY 104 | W | 0 | 1 | 0 | 0 | 0 | 0 | 010 |
| PROCESSOR 101 | SYSTEM BUS DEVICE 105 | R | 1 | 0 | 0 | 0 | 0 | 0 | 011 |
| PROCESSOR 101 | SYSTEM BUS DEVICE 105 | W | 0 | 0 | 1 | 1 | 0 | 0 | 100 |
| SYSTEM BUS DEVICE 105 | MAIN MEMORY 104 | R | 0 | 0 | 1 | 0 | 0 | 1 | 101 |
| SYSTEM BUS DEVICE 105 | MAIN MEMORY 104 | W | 0 | 1 | 0 | 0 | 1 | 0 | 110 |

FIG. 10

PROCESSOR MAIN MEMORY READ

| | DT_CNT | ACK | RAS | CAS | WE | AD_MPX | S_GNT | S_STB | S_ACK | S_ADD | S_READ |
|---|---|---|---|---|---|---|---|---|---|---|---|
| S1 | ○ | | | | | | | | | | |
| S2 | ○ | | | | | | | | | | |
| S3 | ○ | | ○ | | | | | | | | |
| S4 | ○ | | ○ | | | ○ | | | | | |
| S5 | ○ | | ○ | ○ | | ○ | | | | | |
| S6 | ○ | | ○ | ○ | | ○ | | | | | |
| S7 | | ○ | | | | | | | | | |
| S8 | | | | | | | | | | | |

FIG. 11

PROCESSOR MAIN MEMORY WRITE

| | DT_CNT | ACK | RAS | CAS | WE | AD_MPX | S_GNT | S_STB | S_ACK | S_ADD | S_READ |
|---|---|---|---|---|---|---|---|---|---|---|---|
| S1 | ○ | | | | | | | | | | |
| S2 | ○ | | | | | | | | | | |
| S3 | ○ | | ○ | | | | | | | | |
| S4 | ○ | | ○ | | ○ | ○ | | | | | |
| S5 | ○ | | ○ | ○ | ○ | ○ | | | | | |
| S6 | | ○ | ○ | ○ | ○ | | | | | | |

FIG. 12

PROCESSOR SYSTEM BUS DEVICE READ

| | DT_CNT | ACK | RAS | CAS | WE | AD_MPX | S_GNT | S_STB | S_ACK | S_ADD | S_READ |
|---|---|---|---|---|---|---|---|---|---|---|---|
| S1 | O | | | | | | | | | | H |
| S2 | O | | | | | | | O | | O | H |
| S3 | O | O | | | | | | | | O | H |
| S4 | | | | | | | | | | | |

FIG. 13

PROCESSOR SYSTEM BUS DEVICE WRITE

| | DT_CNT | ACK | RAS | CAS | WE | AD_MPX | S_GNT | S_STB | S_ACK | S_ADD | S_READ |
|---|---|---|---|---|---|---|---|---|---|---|---|
| S1 | O | | | | | | | | | O | L |
| S2 | O | | | | | | | | | O | L |
| S3 | O | | | | | | | O | | O | L |
| S4 | | O | | | | | | | | | |

FIG. 14
DMA READ

|    | DT_CNT | $\overline{ACK}$ | $\overline{RAS}$ | $\overline{CAS}$ | $\overline{WE}$ | AD_MPX | $\overline{S\_GNT}$ | $\overline{S\_STB}$ | $\overline{S\_ACK}$ | S_ADD | S_READ |
|----|--------|-----|-----|-----|----|--------|-------|-------|-------|-------|--------|
| S1 | ○ |   |   |   |   |   |   |   |   |   |   |
| S2 | ○ |   |   |   |   |   |   |   |   |   |   |
| S3 | ○ |   | ○ |   |   |   |   |   |   |   |   |
| S4 | ○ |   | ○ |   |   | ○ | ○ |   |   |   |   |
| S5 | ○ |   | ○ | ○ |   | ○ | ○ |   |   |   |   |
| S6 | ○ |   | ○ | ○ |   | ○ | ○ |   |   |   |   |
| S7 | ○ |   | ○ | ○ |   | ○ | ○ |   |   |   |   |
| S8 | ○ |   | ○ | ○ |   | ○ | ○ |   | ○ |   |   |
| S9 |   |   |   |   |   |   |   |   |   |   |   |

FIG. 15
DMA WRITE

|    | DT_CNT | $\overline{ACK}$ | $\overline{RAS}$ | $\overline{CAS}$ | $\overline{WE}$ | AD_MPX | $\overline{S\_GNT}$ | $\overline{S\_STB}$ | $\overline{S\_ACK}$ | S_ADD | S_READ |
|----|--------|-----|-----|-----|----|--------|-------|-------|-------|-------|--------|
| S1 | ○ |   |   |   |   |   |   |   |   |   |   |
| S2 | ○ |   |   |   |   |   | ○ |   |   |   |   |
| S3 | ○ |   | ○ |   |   |   | ○ |   |   |   |   |
| S4 | ○ |   | ○ |   | ○ | ○ | ○ |   |   |   |   |
| S5 | ○ |   | ○ | ○ | ○ | ○ | ○ |   |   |   |   |
| S6 |   |   | ○ | ○ | ○ |   |   |   | ○ |   |   |

BUS SYSTEM FOR USE WITH INFORMATION PROCESSING APPARATUS

This application is a continuation application of U.S. Ser. No. 08/449,088, filed May 24, 1995; U.S. Pat. No. 5,668,956 which was a continuation application of U.S. Ser. No. 08/311,893, filed Sep. 26, 1994, now U.S. Pat. No. 5,483, 642; which was a continuation application of U.S. Ser. No. 07/705,701, filed May 23, 1991, now abandoned.

BACKGROUND OF THE INVENTION

The present invention relates to a bus system employed in information processing apparatuses such as a workstation, a personal computer, and a word processor.

The bus system disposed in the information processing apparatus is configured; like a bus system described in a report "EISA" written by L. Brett Glass in pages 417 to 424 of "BYTE", Volume 14, Number 12 (1989); such that memory and system buses are respectively connected to a processor bus or processor and memory buses are respectively linked to the system bus.

In the former constitution, during a cooperative action of the system and memory buses, namely, during the so-called direct memory access (DMA), the processor bus cannot operate in an independent fashion, which consequently leads to a deterioration of the utilization efficiency of the processor bus. In the latter case, on the other hand, during a cooperative operation of the processor and memory buses i.e. during the so-called main memory access, the system bus cannot operate in an independent manner, thereby leading to a problem of a deterioration of the utilization efficiency of the system bus.

In this regard, the configuration and the problems of the conventional bus system will be described in detail later by referring to drawings.

SUMMARY OF THE INVENTION

It is therefore an object of the present invention to provide a bus system for use with an information processing apparatus capable of maximizing the utilization efficiency of each bus.

Another object of the present invention is to provide a bus system in which a cooperative action of a processor bus and a memory bus and an independent operation of a system bus can be accomplished at the same time.

Still another object of the present invention is to provide a bus system in which a cooperative action of a system bus and a memory bus and an independent operation of a processor bus can be accomplished at the same time.

Still another object of the present invention is to provide a bus system for use with an information processing apparatus in which when there is established an interconnection between at least three buses including three kinds of buses i.e. system, memory, and processor buses, the utilization efficiency of each bus can be maximized.

In order to achieve the objects above, according to the present invention, there is established a configuration in which an interconnection is constituted in the form of a three-way connection with three types of buses including the processor, memory, and system buses such that while two arbitrary types of buses are achieving a cooperative operation, the bus of the other type can operate in an independent manner.

That is, according to the present invention, there is disposed control means forming a three-way connection of three kinds of buses including a processor bus linked to at least one processor, a memory bus connected to a main memory, and a system bus linked to at least one connected device such as an input/output (I/O) device, thereby establishing interconnections between various buses.

In other words, according to the present invention, a bus system for use with an information processing apparatus includes three kinds of buses including a processor bus linked to at least one processor, a memory bus connected to a main memory, and a system but linked to at least one connected device and connection control means for interconnecting these buses to each other.

In accordance with the present invention, the connection control means includes data path switch means for transferring data through the data buses respectively of the three kinds of buses thus interconnected to each other and a bus/memory connection controller for transferring control signals and addresses through the control and address buses respectively of the three kinds of buses and for generating a data path control signal to be supplied to the data switch means.

Preferably, the data switching means and the bus/memory connection controller are configured respectively as integrated circuits or are combined with each other in an integrated circuit.

Furthermore, according to the present invention, the number of the buses of each kind need not be limited to one, namely, even when there are disposed a plurality of buses of either one of the three kinds, the connection control means may be similarly constructed to establish an interconnection between these buses.

In the configuration of the present invention described above, with an interconnection of the three kinds of buses including the processor, memory, and system buses, for example, when a processor on the processor bus conducts a processor/main memory access to access the main memory on the memory bus, data is transferred only via the processor and memory buses i.e. the system bus is not used for the data transfer. Consequently, the system bus can operate in an independent fashion. On the other hand, when a connected device on the system bus achieves a DMA to access the main memory on the memory bus, data is transferred only through the system and memory buses. That is, the processor bus is not employed for the transfer and hence can achieve an independent operation.

As a result, it is possible to develop the maximum utilization efficiency for each of the three kinds of buses.

BRIEF DESCRIPTION OF THE DRAWINGS

These and other objects and advantages of the present invention will become apparent by reference to the following description and accompanying drawings wherein:

FIG. 9 is a diagram showing correspondences between a data path control signal 420 to be decoded by a decoder 510 of the data pass switch 402 of FIG. 5 and results of the decoding operation according to the present invention;

FIGS. 10 to 15 are diagrams showing relationships between the data pass control signal ($DT_{13}$ CNT) 420 and other signals in the various steps of state transition in the processor/main memory read, processor/main memory write, processor/system bus device read, processor/system bus device write, DMA read, and DMA write operations, respectively;

DESCRIPTION OF THE PREFERRED EMBODIMENTS

Figure 1:
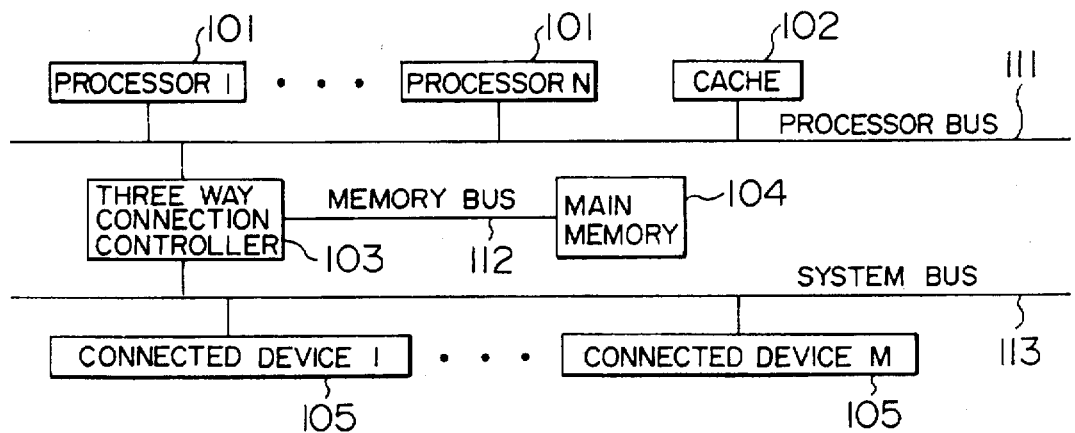
FIG. 1 is a schematic diagram showing the configuration of a first embodiment of a bus system according to the present invention.

Referring now to the drawings, a description will be given of embodiments of a bus system according to the present invention.

First, a first embodiment of the present invention will be described with reference to FIGS. 1 to 6. In this regard, FIGS. 2 and 3 show configurations of a bus system in the conventional technology, which will be described here in detail for comparison with the present invention.

Figure 2:
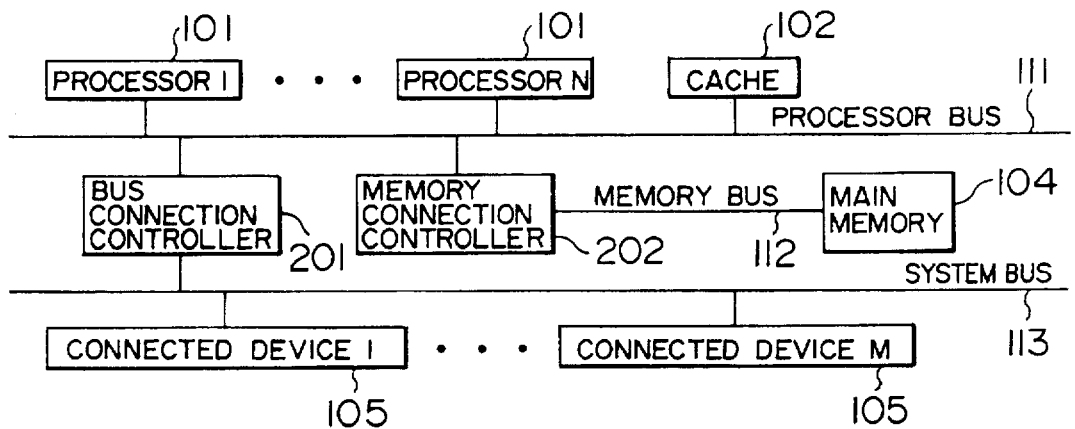
FIGS. 2 and 3 are diagrams schematically showing configurations of bus systems of the prior art.
Figure 3:
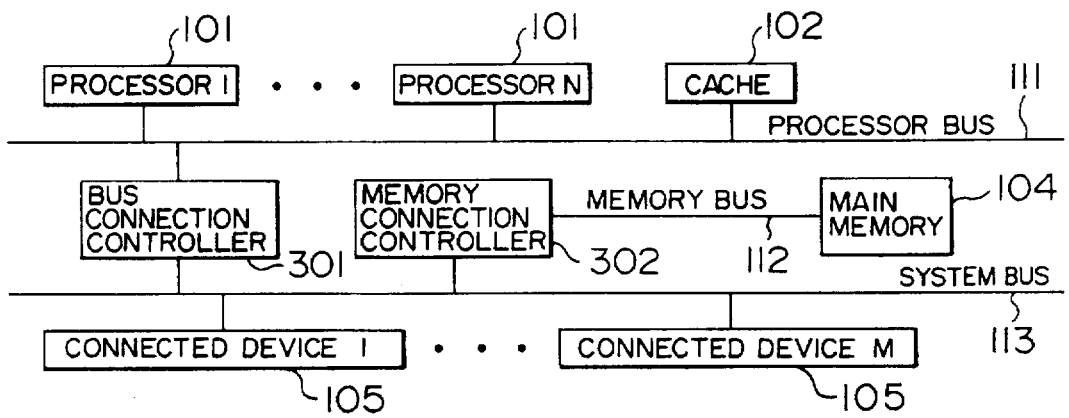

In each of FIGS. 1 to 3, there are disposed processors 101 (n processors; where, n is an integer), a cache memory system 102, a main memory 104, and system bus connection devices 105 (M devices; where, M is an integer). The connected devices 105 may be so-called I/O devices such as a controller for disk files, a controller for drawing and for displaying images, and a controller for networks and communications. Reference numerals 111, 112, and 113 denote a processor bus, a memory bus, and a system bus, respectively. In FIG. 1, a numeral 103 designates a three-way connection controller. In FIGS. 2 and 3, numerals 201 and 301 respectively correspond to bus connection controllers 201 and 301 and memory connection controllers 202 and 302.

In the conventional bus systems of these figures, the system bus 113 and the memory bus 112 of FIG. 2 are respectively connected via the bus connection controller 201 and the memory connection controller 202 to the processor bus 111 in an independent manner. On the other hand, in FIG. 3, the processor bus 111 and the memory bus 112 are respectively connected via the bus connection controller 301 and the memory connection controller 302 to the system bus 113 in an independent manner.

In the constitution of FIG. 2, for a DMA operation transferring data between a connected device 105 on the system bus 113 and the main memory 104 on the memory bus 112, the data is sent via the processor bus 111. In consequence, it is impossible to simultaneously achieve the DMA operation and an independent operation of the processor bus 111, for example, for a data transfer between the processor 101 and the cache 102 or between a plurality of processors 101. On the other hand, in the structure of FIG. 3, in the so-called processor/main memory access in which data is transferred between the processor 101 and the main memory 104, data is passed through the system bus 113. Consequently, it is impossible to simultaneously achieve the processor/main memory access and an independent operation of the system bus 113 e.g. for a data transfer between a plurality of devices 105 connected to the system bus 113.

In contrast thereto, the bus system shown in FIG. 1 as the first embodiment of the present invention is configured such that three kinds of buses i.e. the processor bus 111, the memory bus 112, and the system bus 113 are connected to each other in a three-way connection by the three-way connection controller 103. In consequence, for a DMA operation, data is not passed through the processor bus 111, and hence an independent operation of the processor bus 111 and the DMA operation can be simultaneously executed. Moreover, since the system bus 113 is not used for a processor/main memory access, an independent operation of the system bus 113 and the processor/main memory access can be accomplished at the same time. With the provisions above, for the DMA operation and the processor/main memory access, there can be developed a maximized utilization efficiency for each of the three kinds of buses.

Next, a description will be given of an example of performance evaluation on the bus system of the first embodiment of the present invention shown in FIG. 1 and the bus systems of the prior art shown in FIGS. 2 and 3 together with quantitative features of the effect developed by the first embodiment according to the present invention.

In the bus systems of FIGS. 1 to 3, let us assume that the processor bus 111, the memory bus 112, and the system bus 113 have maximum data throughput of 400, 400, and 200 megabytes per second (MB/s). Moreover, it is assumed that the ratio of the main memory access is 40% on the processor bus 111, the ratio of DMA through the system bus 113 is 70%, and the maximum bus acquisition ratio is 50% for the bus connection controllers 201 and 301. Under these conditions, when each of the processor bus 111 and the system bus 113 is operated to develop the maximum throughput, the performance of each bus system will be evaluated as follows.

First, in the conventional bus system of FIG. 2, when the system bus 113 attempts to operate with the maximum throughput of 200 MB/s, a request of DMA equivalent to 70% of the 200 MB/s i.e. 140 MB/s is enabled to be passed to the bus connection controller 201. For the bus connection controller 201, the system allows a processor bus acquisition ratio of up to 50% of 400 MB/s, namely, 200 MB/s. In consequence, the DMA request of 140 MB/s is entirely accepted. As a result, although the system bus 113 operates at a transfer speed of 200 MB/s, the processor bus 111 receiving a DMA request can only operate substantially at a transfer rate of (400−140)=260 MB/s. In this situation, the processor/main memory access is accomplished with a bus acquisition ratio of 40% of 260 MB/s, namely, 104 MB/s. In consequence, a request for a transfer rate of (140+104)=154 MB/s is sent to the memory bus 112, which can cope with this request as described above. In short, the bus utilization efficiency is attained as follows for each of the three kinds of buses in the conventional bus system of FIG. 2, namely, 260/400×100=65% for the processor bus 111, 254/400×100=63.5% for the memory bus 112, and 200/200×100=100% for the system bus 113.

Next, in the bus system of the prior art shown in FIG. 3, when the processor bus 111 attempts to operate with the maximum throughput of 400 MB/s, a main memory access request associated with 40% of the throughput i.e. 160 MB/s is issued to the bus connection controller 301. However, the bus connection controller 301 is allowed to operate the system bus 113 with a throughput of up to 50% of 200 MB/s, namely, 100 MB/s. Consequently, the processor/main memory access is only processed with a transfer rate of up to 100 MB/s. As a result, the processor bus 111 can operate only with a transfer rate of up to 250 MB/s (100 MB/s is 40% of 250 MB/s). Moreover, in this situation, the system bus 113 operates substantially with a throughput of (200−100)=100 MB/s. In consequence, the DMA request is issued with a transfer rate of 70% of 100 MB/s i.e. 70 MB/s. Resultantly, there is produced a request of (100+70)=170 MB/s to the memory bus 112, which can accept this request as above. In summary, the bus utilization efficiency is obtained as follows for each of the three kinds of buses in the conventional bus system of FIG. 3, namely, 250/400×100= 62.5% for the processor bus 111, 170/400×100=42.5% for the memory bus 112, and 100/200×100=50% for the system bus 113.

As contrast therewith, in the bus system shown in FIG. 1 as the first embodiment according to the present invention, when the processor bus 111 attempts to operate at a transfer rate of 400 MB/s, a main memory access request is sent to the three-way connection controller 103 for a transfer rate equal to 40% of 400 MB/s i.e. 160 MB/s. In addition, when the system bus 114 tries to operate with a throughput of 200 MB/s, a DMA request of a transfer rate identical to 70% of 200 MB/s i.e. 140 MB/s is passed to the three-way connection controller 103. In response thereto, the three-way connection controller 103 issues to the memory bus 112 a transfer request including the processor/main memory access request and the DMA request with a resultant transfer rate of (160+140)=300 MB/s. The memory bus 112 can cope with this request. In consequence, the processor bus 111 and the system bus 113 are capable of operating at 400 and 200 MB/s, respectively. That is, the bus utilization efficiency is obtained as follows for each of the three kinds of buses in the bus system shown as the first embodiment of the present invention in FIG. 1, namely, 400/400×100=100% for the processor bus 111, 300/400×100=75% for the memory bus 112, and 200/200×100=100% for the system bus 113.

The results above are presented in Table 1 below. As can be seen therefrom, based on the bus system of the present invention of FIG. 1, it is to be understood that the bus utilization efficiency is maximized for the three kinds of buses.

TABLE 1

|  | FIG. 1 | FIG. 2 | FIG. 3 |
| --- | --- | --- | --- |
| Utilization efficiency of processor bus 111 | 100% | 65% | 62.5% |
| Utilization efficiency of memory bus 112 | 75% | 63.5% | 42.5% |
| Utilization efficiency of system bus 113 | 100% | 100% | 50% |

Incidentally, prior to a description of an embodiment showing a specific constitution of the present invention, a description will be given of bus systems as second and third embodiments according to the present invention with reference to FIGS. 7 and 8.

Figure 7:
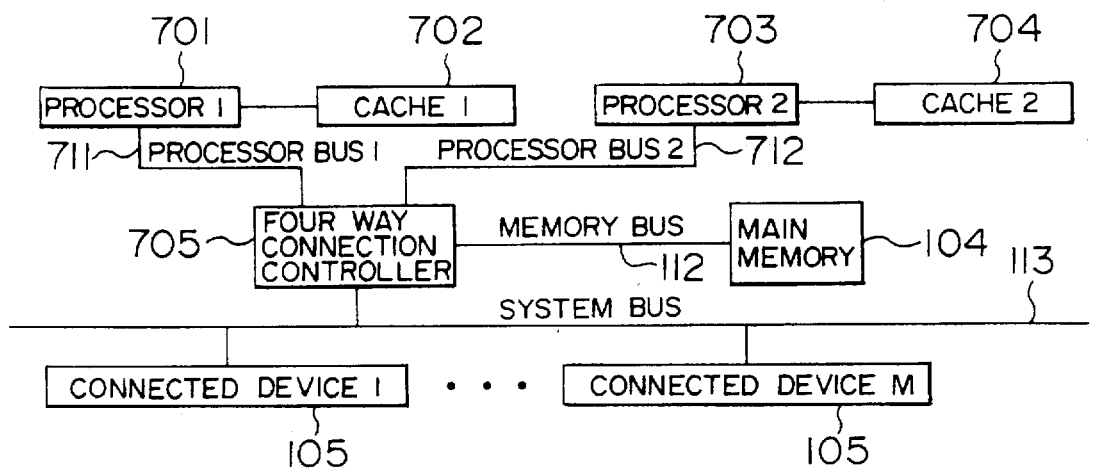
FIG. 7 is a schematic diagram showing the constitution of a second embodiment of a bus system according to the present invention.
Figure 8:
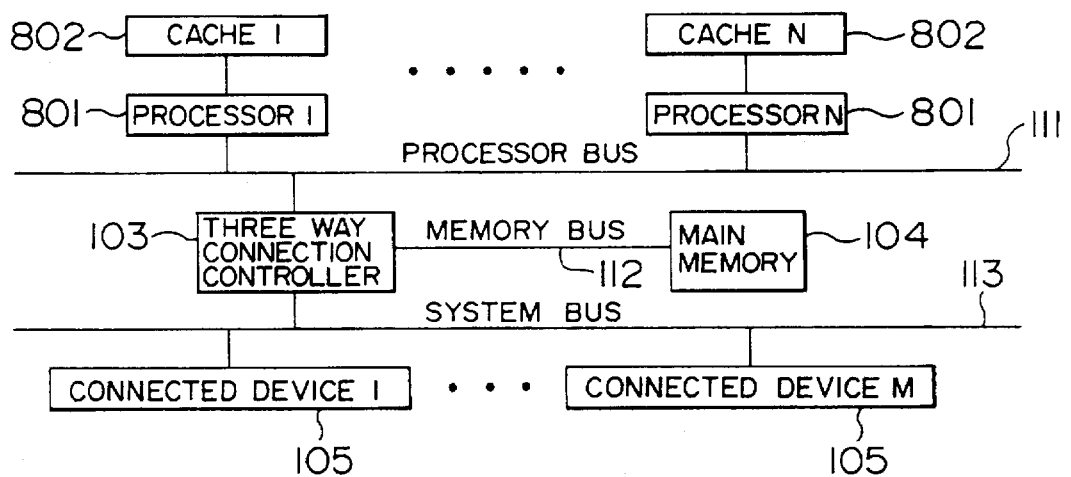
FIG. 8 is a schematic diagram showing the configuration of a third embodiment of a bus system according to the present invention.

In FIGS. 7 and 8, reference numerals 701 and 703 denote single-type processors and a reference numeral 801 stands for multiple-type processors 1 to N, where each of these processors may be connected to a separate cache memory system. Numerals 701 and 703 indicate processor buses respectively linking the processors 701 and 703 with a four-way connection controller 705. The four-way connection controller 705 further connects processor buses 711 and 712, a memory bus 112, and a system bus 113 to each other. Furthermore, reference numerals 702, 704, and 802 designate cache memory systems separately connected to the processors 701, 703, and 801, respectively. In this regard, devices 105 connected to the system bus 113 are similar to the I/O devices of the preceding embodiment.

In the second embodiment of the present invention shown in FIG. 7, four buses including three kinds of buses i.e. the two processor buses 711 and 712, the memory bus 112, and the system bus 113 are connected to form a four-way connection by the four-way connection controller 705. The processors 701 and 703 are singletype processors to which the cache memory systems 702 and 704 can be respectively connected. In consequence, although the processors 701 and 703 can directly access the separate cache memories 702 and 704 respectively without using the processor buses, the processor buses cannot be shared therebetween.

In FIG. 7, the four-way connection controller 705 accomplishes the connection control between four buses including three types of buses such that, for example, a communication between the processors 701 and 703 is achieved in concurrence with a DMA operation or a main memory access from the processor 701 and a system bus access from the processor 702 are concurrently executed. With the provision above, also in this embodiment, like in the embodiment described before, the bus utilization efficiency can be increased to the maxim extent for the four buses including three kinds of buses.

FIG. 8 is constituted with, like the first embodiment of FIG. 1, three kinds of buses including a processor bus 111, a memory bus 112, and the system bus 113, which are connected to each other in a three-way connection by a three-way connection controller 103. A reference numeral 801 indicates a multi-type processor to which a separate cache memory system 802 can be connected. Consequently, each processor 801 can access the cache memory system 802 without employing the processor bus 111. Moreover, the processor bus 111 can be used as a shared unit. In addition, in the bus system shown in FIG. 8 as a third embodiment according to the present invention, like in the embodiment of FIG. 1, the operations above are possible, for example, a DMA operation and an independent operation of the processor bus 111 can be concurrently achieved or a main memory access from the processor bus 111 can be accomplished in parallel with an operation of the system bus 113. As a result, also in this case, like in the first embodiment, there can be developed the maximum utilization efficiency of the three buses associated with three different kinds.

Figure 4:
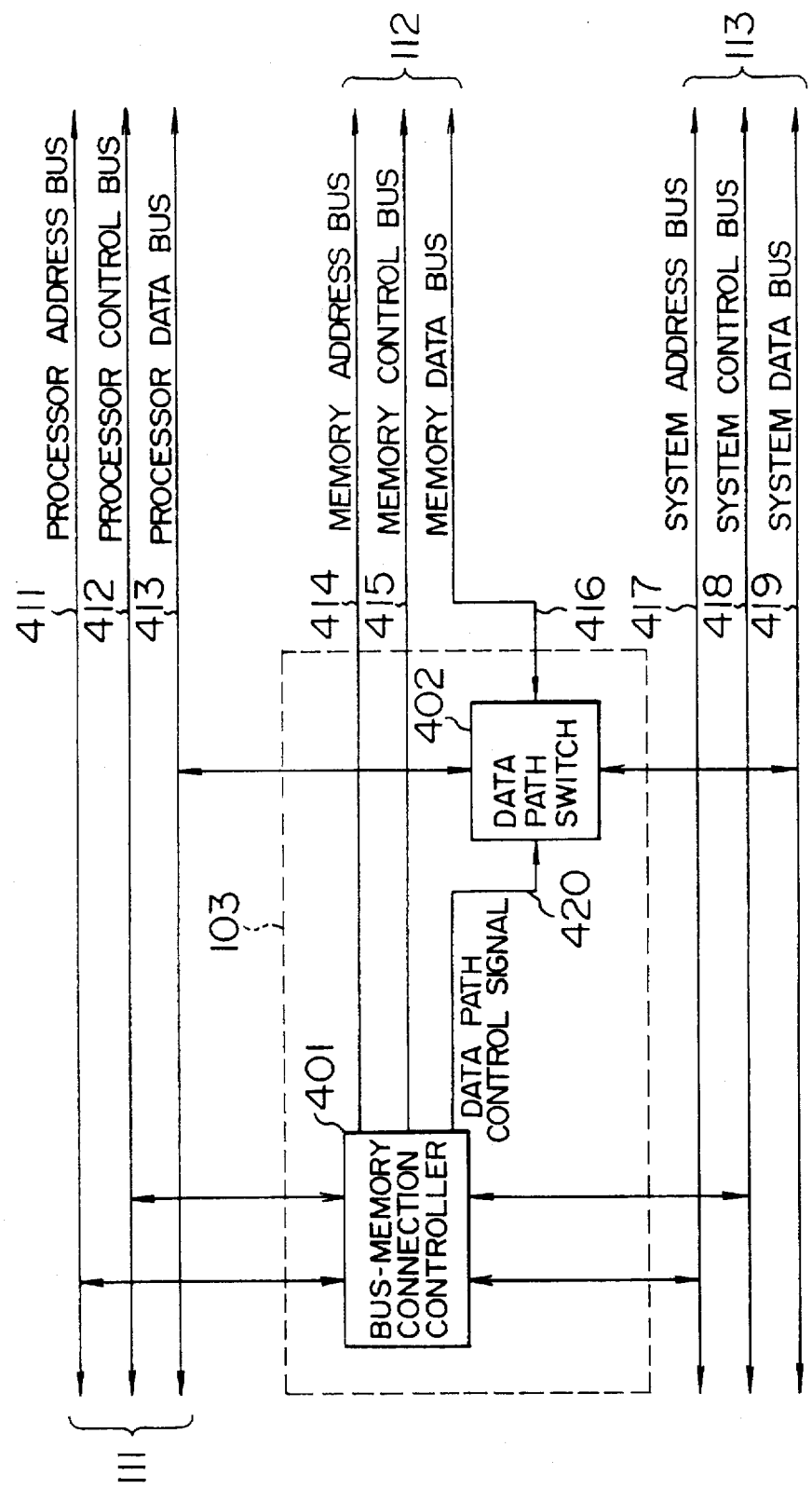
FIG. 4 is a diagram illustratively showing an embodiment of a three-way connection controller 103 in the first embodiment of the present invention shown in FIG. 1.
Figure 5:
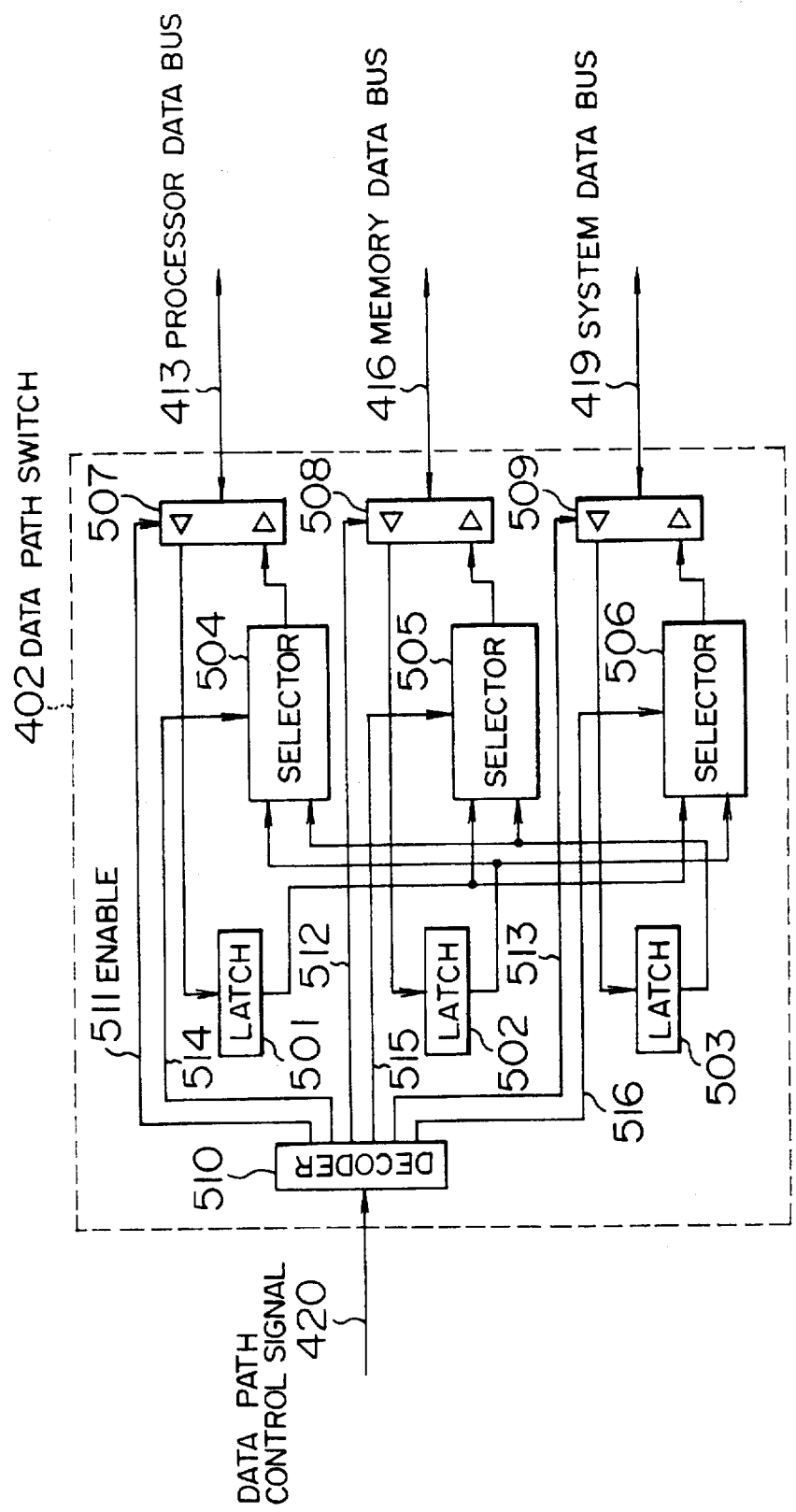
FIGS. 5 and 6 are block diagrams respectively showing embodiments of a data path switch 402 and a bus/memory connection controller 401 in the embodiment of the three-way connection controller 103 of FIG. 4 used in the first embodiment of the present invention.
Figure 6:
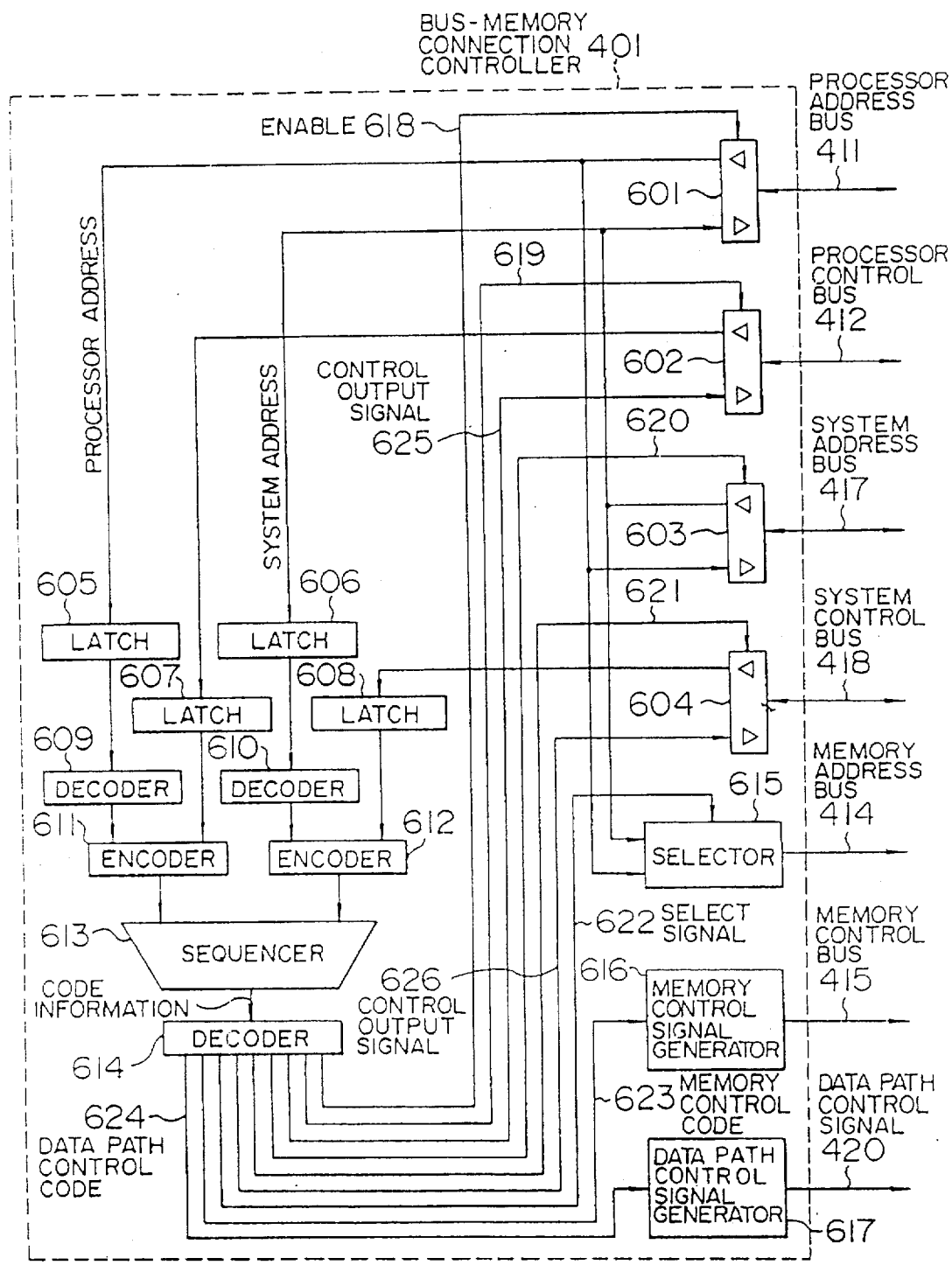

Referring next to FIGS. 4 to 6, a description will be given of concrete embodiments of essential sections of the embodiments according to the present invention described above. Although a detailed configuration of the three-way connection controller 103 will be particularly described in conjunction with the first and third embodiments respectively shown in FIGS. 1 and 8, the four-way connection controller 705 of FIG. 7 may also be constructed in a similar manner.

In this connection, FIG. 4 shows the constitution of the three-way connection controller 103 including two integrated circuits. In FIG. 4, the three-way connection controller 103 is connected to a processor bus 111, a memory bus 112, and a system bus 113. These buses respectively include address buses 411, 414, and 417; control buses 412, 415, and 148; and data buses 413, 416, and 419. In this embodiment, the three-way connection controller 103 is constituted with two integrated circuits i.e. a bus-memory connection controller 401 and a data path switch 402. However, the three-way connection controller 103 may be implemented with an integrated circuit or plural integrated circuits.

The data path switch 402 is disposed to establish a three-way connection between three types of buses including the processor data bus 413, the memory data bus 416, and the system data bus 419. The data path switch 402 is responsive to a data path control signal 420 outputted from the bus-memory connection controller 401 to achieve connections and disconnections between the three types of data buses 413, 416, and 419 and to control data I/O directions on the buses.

On the other hand, the bus-memory connection controller 401 is connected to the processor address bus 411, the processor control bus 412, the system address bus 417, and the system control bus 418 so as to monitor states of the processor bus 111 and the system bus 113. Moreover, the bus-memory connection controller 401 produces signals for the memory address bus 414 and the memory control bus 415 and the data path control signal 420 to control the main memory 104 and the data path switch 402. The data pass control signal 420 will be described later in detail.

The bus-memory connection controller 401 causes, in response to a request issued from the processor bus 111 for a processor/main memory access, the processor bus 111 and the memory bus 112 to achieve a cooperative action and then sets the system bus 113 to an independent operation. Furthermore, when a DMA operation request is issued from the system bus 113, the bus-memory connection controller 401 activates the system bus 113 and the memory bus 112 to conduct a cooperative operation and causes the processor bus 111 to achieve an independent operation. In addition, when the processor bus 111 sends an access request to the system bus 113 or when the system bus 113 issues an access request to the processor bus 111, the bus-memory connection controller 401 sets the processor bus 111 and the system bus 113 in a cooperative action. Moreover, when there appears a conflict between a request from the processor bus 111 and a request from the system bus 113, for example, when memory accesses are simultaneously received therefrom, the bus-memory connection controller 401 develops a function achieving an arbitration control, for example, to set either one of the buses 111 and 113 to a wait state.

FIG. 5 is a diagram showing the internal configuration of an embodiment of the data path switch 402 shown in FIG. 4. FIG. 5 includes data input/output drivers 507, 508, and 509 respectively connected to a processor data bus 413, a memory data bus 416, and a system data bus 419; data latch circuits 501, 502, and 503; and data selectors 504, 505, and 506. A decoder 510 is disposed in this configuration to decode a data path control signal 420 produced from the bus-memory connection controller 401 so as to generate output enable signals 511, 512, and 513 respectively for the data I/O drivers 507, 508, and 509 as well as select signals 514, 515, and 516 respectively for the data selectors 504, 505, and 506.

The data latches 501, 502, and 503 are disposed to store therein input data respectively from the processer data bus 413, the memory data bus 416, and the system data bus 419. The selectors 504 to 506 are used to select, from input data from the two remaining data buses, data to be respectively supplied to the processor data bus 413, the memory data bus 416, and the system data bus 419, thereby achieving a control operation as follows. Namely, input data of an arbitrary one of three kinds of data buses is outputted to the buses of other kinds; alternatively, the input data is passed only to one of the other buses. In consequence, based on the data pass control signal 420, all of the three kinds of data buses may be operated in a cooperative manner or a cooperative operation of two arbitrary kinds of buses and an independent operation of the other one kind of bus may be achieved.

FIG. 6 is a diagram showing an embodiment of the internal configuration of the bus-memory connection controller 401. FIG. 6 includes I/O drivers 601 to 604, latch circuits 605 to 608, decoder circuits 609 and 610, encoder circuits 611 and 712, a sequencer 613 constituted with an arithmetic logic unit, a memory control signal generator 616, and a data path control signal generator 617.

Input signals respectively from a processor address bus 411, a processor control bus 412, a system address bus 417, and a system control bus 418 are stored respectively via the I/O drivers 601, 602, 603, and 604 in the latch circuits 605, 607, 606, and 608, respectively. The addresses inputted from two kinds of buses and thus loaded in the latch circuits 605 and 606 are then decoded by the decoder circuits 609 and 610, respectively. Results from the decoding operations are processed together with data of the latch circuits 607 and 608 i.e. input signals from the two types of control buses 412 and 418. Namely, the encoder circuits 611 and 612 encode the associated inputs to generate signals designating states of the processor bus 111 and the system bus 113, respectively. As a result, the bus-memory connection controller 401 can monitor the states of the processor bus 111 and the system bus 113, respectively.

The state signals thus encoded by the encoder circuits 611 and 612 respectively for the processor bus 111 and the system bus 113 are fed to the sequencer 613 including an arithmetic logic unit. Depending on the state signals of the two types of buses 111 and 113, the sequencer 613 computes correspondences of the respective buses and determines an operation for the memory bus 112, thereby producing code information. The sequencer 613 will be constituted with a general-purpose microprocessor and an exclusive hardware configuration.

The code information created from the sequencer 613 is decoded by the decoder circuit 614, which generates output enable signals 618 to 621 respectively to the I/O drivers 601 to 604, a select signal 622 to the selector circuit 615, a memory control coce 623 and a data path control code 624 respectively to the memory control signal generator 616 and the data path control signal generator 617, and control output signals 625 and 626 to be respectively sent to the processor control bus 412 and the system control bus 418 via the I/O drivers 602 and 604, respectively.

The I/O driver 601 is responsive to a request issued from the system bus 113 for an access to the processor bus 111 to output to the address bus 411 an I/O address received from the system address bus 417. Moreover, the I/O driver 602 supplies the processor control bus 412 with a control output signal 625 specified in association with the processor bus 111. On the other hand, the I/O driver 603 is operative, when the processor bus 111 issues an access request to the system bus 113, to send to the system address bus 417 an I/O address from the processor address bus 411. Furthermore, the I/O driver 604 outputs to the system control bus 418 a control output signal 626 defined in conformity with specifications of the system bus 113.

The selector circuit 615 receives addresses from the processor address bus 411 and the system address bus 417 such that when an access to the memory bus 112 occurs, either one of the received addresses is selected to send the selected address onto the memory address bus 414. The memory control signal generator 616 serves as a code conversion circuit such that a memory control code 623 produced from the decoder circuit 614 is converted into a memory control signal stipulated according to specifications of the memory bus 112, thereby outputting the resultant signal to the memory control bus 415. The data path control signal generator 617 also functions as a code conversion circuit to convert a data pass control code 614 created from the decoder circuit 614 into a data pass control signal 420 associated with the data pass switch 402 so as to output the obtained signal 420.

As described above, the bus-memory connection controller 401 disposed in the three-way connection controller 103 can develop control operations such as connections, disconnections, and wait operations for the three kinds of buses.

In addition, referring to FIGS. 9 to 19, a description will be given in detail of embodiments of various data and signals processed in the three-way connection controller 103.

FIG. 9 shows an example of relationships between the data path control signal 420 outputted from the bus-memory connection controller 401 to the data path switch 402, enable signals 511, 512, and 513 decoded by the decoder circuit 510 respectively for the I/O drivers 507, 508, and 509 in association with the control signal 420, and select signals 514, 515, and 516 for the data selectors 504, 505, and 506. In this diagram, the master, slave, and read/write fields in the upper-most row indicate a master unit, a slave unit, and a read or write request for a data transfer from the master unit to the slave unit, respectively. The remaining fields of the upper-most row includes signal names corresponding to the signals 511 to 516 of FIG. 5. Specifically, DT_CNT in the right-most field of the row designates the data path control signal 420. This signal DT_CNT includes three bits in this embodiment. In an idle state where data is not transferred, DT_CNT 40 is set to 0 ("000").

The enable signals (DIR_P, DIR_M, and DIR_S) 511, 512, and 513 are "0" or "1" when the associated I/O drivers 507, 508, and 509 are in the input or output state, respectively. The select signal (SEL_P) 514 is set to "0" or "1" when the selector 504 selects the port of the memory bus 112 or the system bus 113, respectively. Moreover, the select signal (SEL_M) 515 is "0" or "1" when the selector 505 selects the port of the processor bus 111 or the system bus 113, respectively. In addition, the select signal (SEL_S) 516 is "0" or "1" when the selector 506 selects the port of the processor bus 111 or the memory bus 112, respectively. According to this diagram, based on DT_CNT 420 inputted to the decoder 510 of the data path switch 402, the selectors 504 to 506 and the I/O drivers 507 to 509 can be controlled in the data path switch 402, thereby controlling directions of the three-way connection between the three kinds of buses.

Figure 18:
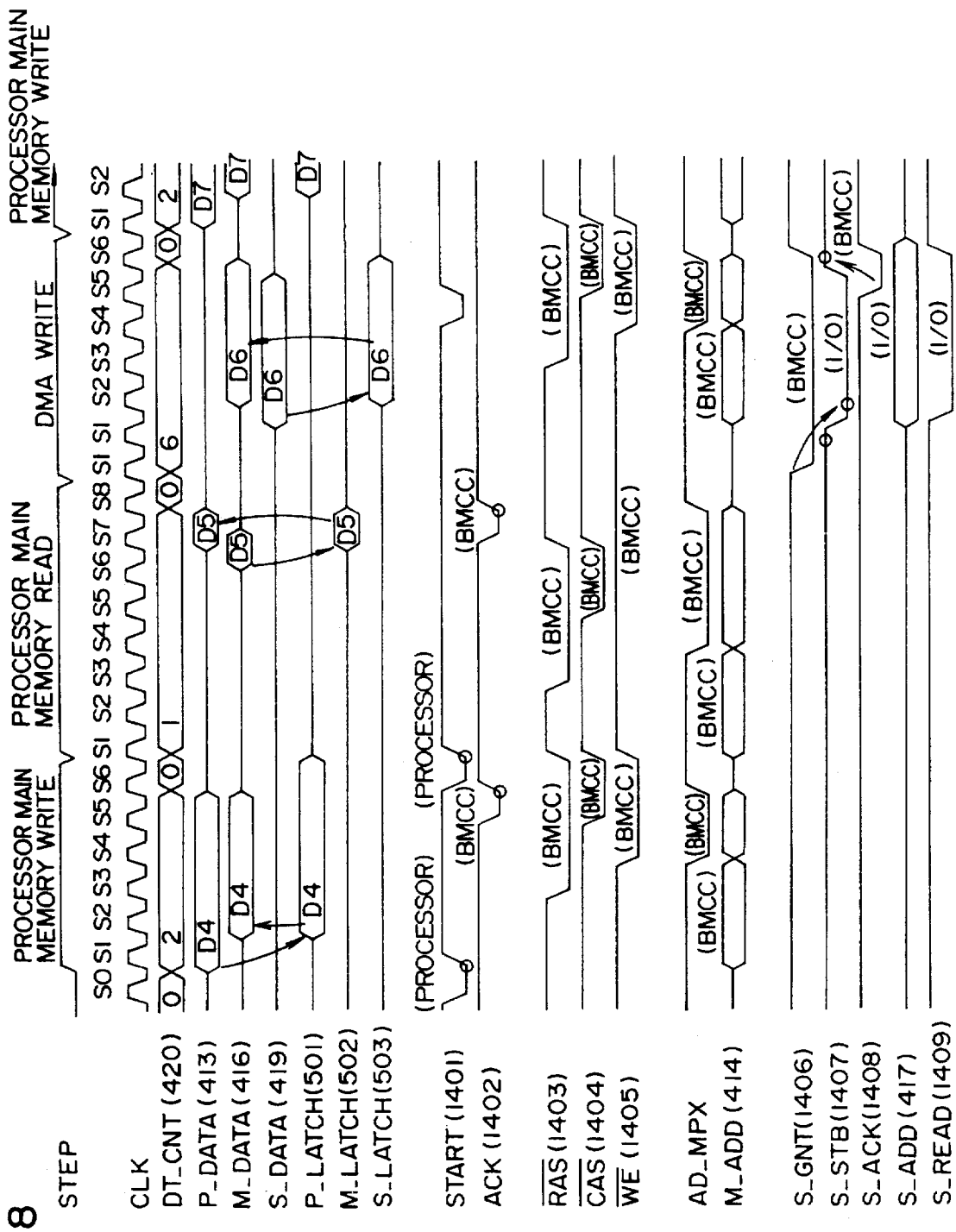
Figure 19:
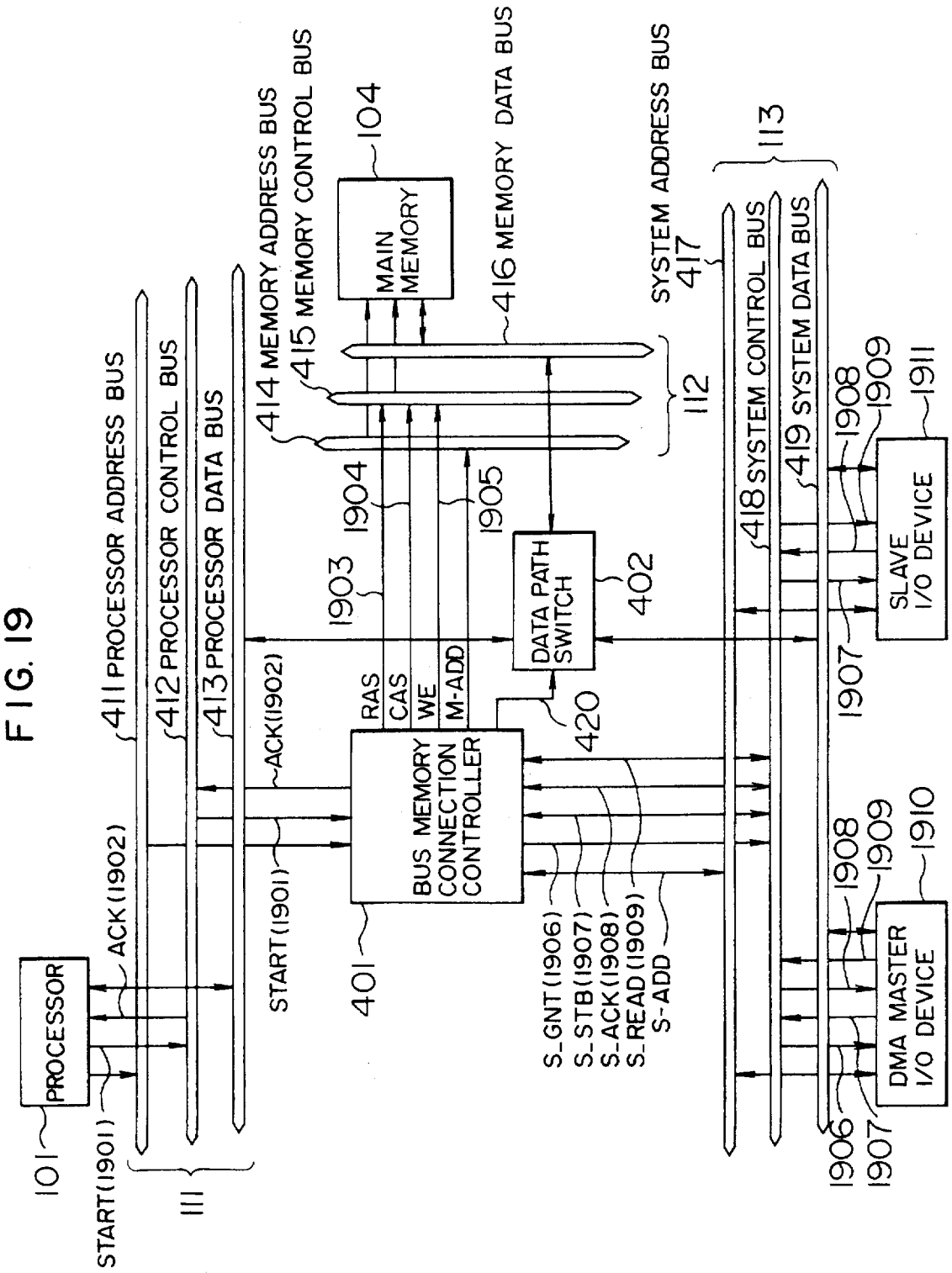
FIG. 19 is a configuration diagram specifically showing connections of signals of FIGS. 17 and 18 between the three-way connection controller 103 of FIG. 4 and the respective buses 111 to 113.

Subsequently, operations of the three-way connection controller 103 will be described by referring to the configuration diagram of FIG. 19 showing in detail the buses connected to the three-way connection controller 103 of FIG. 4 and the signal timing charts of FIG. 17 and 18.

In these diagrams, the same constituent elements as those of FIGS. 1 and 4 are designated by the same reference numerals. Numerals 1910 and 1911 respectively denote a DMA master I/O device and a slave I/O device respectively corresponding to the devices 105 connected to the system bus 113. In FIG. 19, a acknowledge signal (ACK) 1902 is a response signal to a processor 101 and indicates confirmation of data or acquisition of data in the read or write operation, respectively.

A row address strobe signal (RAS) 1903, a column address strobe signal (CAS) 1904, and a write enable signal (1905) constitute a portion of the memory control signals to be sent to the memory control bus 415 of the main memory 104. The address multiplex signal (AD_MPX) is an internal signal of the bus-memory connection controller 401 and is set to a high state or a low state to output a row address or a column address, respectively. The system bus grant signal (S_GNT) 1906 is used to grant a bus mastership i.e. to allow an I/O device 1910 which is one of the connected devices 105 and which may be set to a DMA master unit to use the system bus 113. As a result, the I/O device 1910 can be operated as a DMA master unit. The address/data strobe signal (S_STB) 1907 is produced from a system bus master unit. For a DMA access or a processor I/O access, this signal 1907 is outputted to the DMA master I/O device 1910 or the bus-memory connection controller 401, respectively. For a read or write operation, the system bus strobe signal (S_STB) 1907 is kept outputted for an assertion period of an address or an address and data, respectively. The system bus slave acknowledge signal (S_ACK) 1908 is a response signal from the system bus slave unit. For a DMA access or a processor system I/O access, this signal 1908 is outputted from the bus-memory controller 401 or the slave I/O device 1911, respectively. The system bus acknowledge signal (S_ACK) 1908 indicates assertion of data in a read operation and acquisition of data in a write operation. Signals S_GNT 1906, S_STB 1907, S_ACK 1908, and S_READ 1909 designating discrimination between a read operation and a write operation belong to the control output signal 262 to be sent to the system control bus 418. The system bus address (S_ADD) is supplied to the system address bus 417. Incidentally, the system bus read/write signal (S_READ) 1909 is set to a high (H) state for a read operation.

Figure 16:
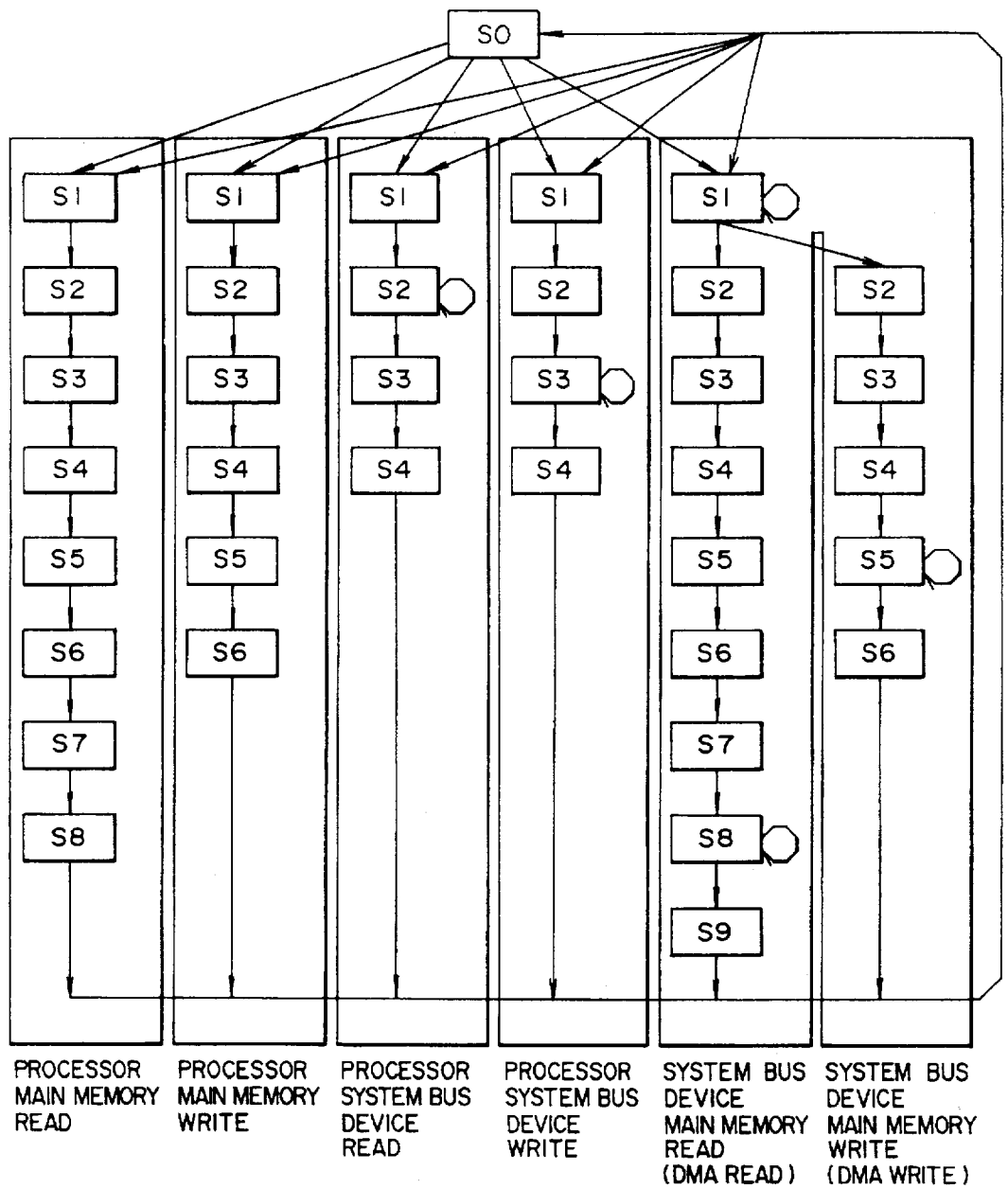
FIG. 16 is a transition diagram showing an example of state transition of a sequencer 601 in the bus/memory connection controller 401 of FIG. 6.

FIG. 16 shows an embodiment of a state transition of the sequencer 613 disposed in the bus-memory connection controller 401. Moreover, FIGS. 10 to 15 are diagrams showing signals outputted in a plurality of steps of the state transition of the respective transfer operations and are respectively associated with the processor/main memory read, processor/main memory write, processor/system bus device read, processor/system bus device write, DMA read, and DMA write operations. In the diagrams, a small circle (○) denotes assertion of an associated signal; furthermore, "H" and "L" of, for example, the signal S_READ 1909 respectively designate a high state and a low state of the signal value. In addition, an overline assigned to a signal name indicates a negative logic of the signal.

In FIG. 16, in a step S2 of the processor/system bus device read associated with FIG. 12, a wait operation takes place for a data assertion from the system bus slave unit. In a step S3 of the processor/system bus device write related to FIG. 13, the system initiates a wait operation for a write response. In step S1 of the DMA read associated with FIG. 14, a wait operation is caused for an S_STB reception; thereafter, based on a read/write judgement at a reception of S_STB, a transition destination is decided for a subsequent step S2. Moreover, in a step S8 of the DMA read and a step S5 of the DMA write, the system initiates a wait operation for negation of the signal S_STB from the DMA master unit.

Figure 17:
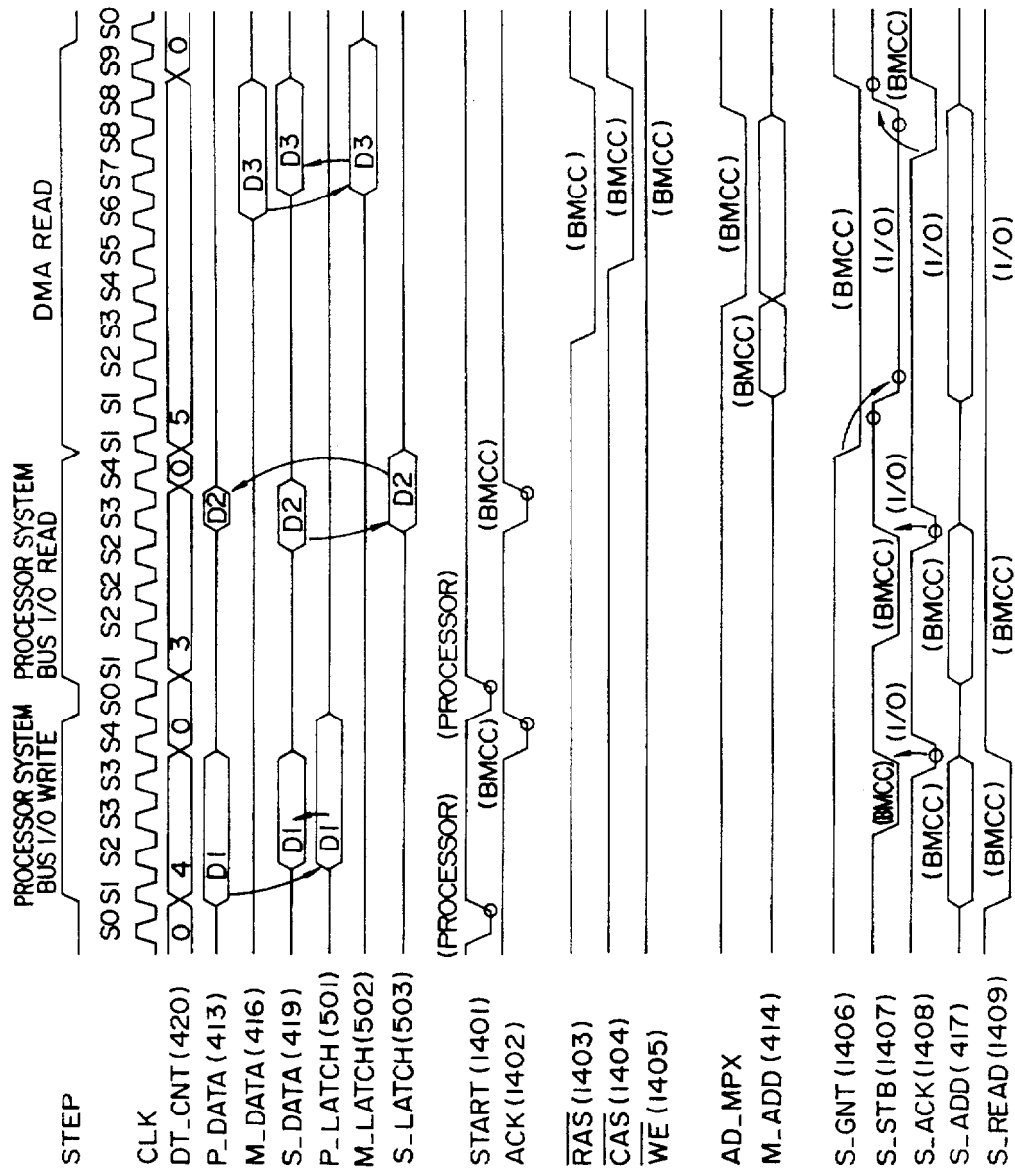
FIGS. 17 and 18 are signal timing charts showing examples of data transfer operations associated with FIGS. 9 to 16.

In the signal timing charts of FIGS. 17 and 18 related to signal transfers conducted according to the specifications of FIGS. 9 to 16, those items enclosed in parentheses denote output sources of the respective signals. That is, for example, (BMCC) designates that the signal is outputted from the bus-memory connection controller (BMCC) 401; moreover, (I/O) indicates the DMA master I/O device 1910 or the slave I/O device 1911 set as a slave unit of the processor/system bus I/O access.

In addition, the latch circuits 501 to 502 of the data path switch 402 shown in FIG. 5 are constituted with edge trigger flip-flops i.e. the latch operation of each latch circuit is initiated at a rising edge of a clock signal (CLK) of FIGS. 17 and 18. In this connection, a start signal (START (1901)) is a transfer start signal, namely, while the start signal is being outputted, an address is latched at a rising edge of the clock (CLK), the address being employed in a subsequent operation. Moreover, a signal M_ADD denotes a memory address to be sent to the memory address bus 414, whereas signals P_Data, M_Data, and S_Data indicate data passed to the processor data bus 413, the memory data bus 416, and the system data bus 419, respectively. Furthermore, signals P_Latch, M_Latch, and S_Latch designate data loaded in the latch circuits 501, 502, and 503, respectively.

As can be seen from FIG. 16, the step S3 of the processor/system bus device write shown in FIG. 13 includes one cycle of a wait operation for assertion of the signal S_ACK. Moreover, the step S2 of the processor/system bus device read of FIG. 12 includes two cycles of a wait operation for assertion of the signal S_ACK (1408). In the DMA read of FIG. 14, the step S1 includes one cycle of a wait operation for assertion of the signal S_STB (1407) and the step S3 includes one cycle of a wait operation for negation of the signal S_STB (1407).

In FIG. 18, the step S1 of the DMA writ includes one cycle of a wait operation for assertion of the S_STB (1407); however, the wait for negation of the signal in the step S5 is completed only through an execution of a wait operation.

As above, the operations of the bus/memory controller 401 and the data path switch 402 of FIGS. 4, 5, and 6 have been described in conjunction with the methods associated with FIGS. 9 to 18, which will help understand the operation of the embodiment of the three-way connection controller 103 shown in FIG. 1.

Although description will not be given of configurations and operations of the four-way connection controller 705 and the like of FIG. 7, the configurations and operations will be easily understood from the description of the configuration and operation of the three-way connection controller.

Moreover, although the processor bus 111, the memory bus 112, and the system bus 113 each are of an address/data separation type in the description given with reference to FIGS. 4 to 19, the present invention can be naturally applicable to buses of an address/data multiplexed type. For example, when the processor bus 111 and the system bus 113 are of an address/data multiplexed type, the system of FIG. 4 will be configured such that the processor address bus 411 and the processor data bus 413 are structured as a bus; moreover, the system address bus 417 and the system data bus 419 are combined to form a bus. The resultant buses are Connected to both of the bus/memory controller 401 and the data path switch 402.

Furthermore, although the description has been given to the embodiments according to the basic concept of the present invention, it is to be udnerstood that various changes and modifications may be made without departing from the present invention.

In accordance with the present invention described in detail above, in the bus system including at least three kinds of plural buses including processor, memory, and system buses, while two kinds of these buses are achieving a cooperative operation, the remaining one kind thereof can conduct an independent operation, which leads to an effect of maximization of the utilization efficiency of the respective buses. Particularly, in a case where the processor bus is connected to a plurality of processors or cache memory systems, concurrent operations can be advantageously accomplished, for example, a DMA operation and a data transfer between a plurality of processors or between a processor and a cache memory system can be simultaneously achieved; moreover, a processor/main memory access and a data transfer between a plurality of devices connected to the system bus can be executed at the same time.

We claim:

1. A data processing system comprising:
   a processor;
   a processor bus coupled to said processor, said processor bus comprising a data bus, an address bus and a control bus;
   a main memory;
   a memory bus coupled to said main memory, said memory bus comprising a data bus, an address bus and a control bus;
   a device;
   a system bus coupled to said device, said system bus comprising a data bus, an address bus and a control bus; and
   a three-way connection controller coupled to said processor bus, said memory bus and said system bus, said three-way controller controlling data transfer among said processor, said main memory and said device, and for executing arbitration control by outputting a grant signal via a grant line granting said bus mastership of said system bus to said device,
   wherein said three-way connection controller controls
      said data bus of said system bus to selectively inhibit latching of data on said system bus of first data being latched for transfer on said processor bus and said memory bus during transferring of said first data between said processor and said main memory,
      said data bus of said processor bus to selectively inhibit latching of data on said processor bus of second data being latched for transfer on said memory bus and said system bus during transferring of said second data between said memory and said device, and
      said data bus of said memory bus to selectively inhibit latching of data on said memory bus of third data being latched for transfer on said processor bus and said system bus during transferring of said third data between said processor and said device.

2. The information processing system according to claim 1, wherein at least one of said processor bus, said memory bus and said system bus is an address/data multiplexed bus.

3. The information processing system according to claim 1, wherein at least one of said processor bus, said memory bus and said system bus is an address/data multiplexed bus.

4. The data processing system according to claim 1, wherein said grant line is connected to said three-way connection controller and said control bus of said system bus, said grant line for transferring a grant signal from said three-way connection controller to said device via said control bus of said system bus.

5. A data processing system comprising:

a processor;

a processor bus coupled to said processor, said processor bus comprising a data bus, an address bus and a control bus;

a main memory;

a memory bus coupled to said main memory, said memory bus comprising a data bus, an address bus and a control bus;

a device;

a system bus coupled to said device, said system bus comprising a data bus, an address bus and a control bus; and a three-way connection controller coupled to said processor bus, and said memory bus and said system bus, said three-way controller controlling data transfer among said processor, said main memory and said device, and for executing arbitration control by outputting a grant signal via a grant line granting said bus mastership of said system bus to said device, wherein said three-way connection controller controls said data bus of said system bus to selectively disable data placement on said system bus of data being enabled for transfer on said processor bus and said memory bus during transferring of data between said processor and said memory, while selectively enabling transfer of other data on said system bus.

6. A data processing system comprising:

a processor;

a processor bus coupled to said processor, said processor bus comprising a data bus, an address bus and a control bus;

a main memory;

a memory bus coupled to said main memory, said memory bus comprising a data bus, an address bus and a control bus;

a device;

a system bus coupled to said device, said system bus comprising a data bus, an address bus and a control bus; and a three-way connection controller coupled to said processor bus, and said memory bus and said system bus, said three-way controller controlling data transfer among said processor, said main memory and said device, and for executing arbitration control by outputting a grant signal via a grant line granting said bus mastership of said system bus to said device, wherein said three-way connection controller controls said data bus of said memory bus to selectively disable data placement on said memory bus of data being enabled for transfer on said processor bus and said system bus during transferring of said data between said processor and said device.

* * * * *